United States Patent
Schulte et al.

[11] Patent Number: 5,195,466
[45] Date of Patent: Mar. 23, 1993

[54] METHOD FOR THE CONTROLLED ADDITION OF AN ADDITIVE TO THE FUEL SUPPLY OF A VEHICLE INTERNAL COMBUSTION ENGINE

[75] Inventors: Roland Schulte, Leutenbach; Hans-Joachim Langer, Remseck; Erwin Strohmer, Berglen; Dietmar Hagenloch, Stuttgart, all of Fed. Rep. of Germany

[73] Assignee: Mercedes Benz AG, Fed. Rep. of Germany

[21] Appl. No.: 887,808

[22] Filed: May 26, 1992

[30] Foreign Application Priority Data

May 25, 1991 [DE] Fed. Rep. of Germany ....... 4117148

[51] Int. Cl.$^5$ .............................................. F02B 75/12
[52] U.S. Cl. .................. 123/1 A; 123/198 A
[58] Field of Search ......................... 123/1 A, 198 A

[56] References Cited

U.S. PATENT DOCUMENTS

| Re. 31,218 | 4/1983 | Hicks et al. | 123/1 A |
| 4,568,248 | 2/1986 | Harders | 123/1 A |
| 4,596,277 | 6/1986 | Djordjevic | 141/98 |

FOREIGN PATENT DOCUMENTS 3626419 9/1988 Fed. Rep. of Germany .

OTHER PUBLICATIONS

Automotive Engineering—(Aug. 1985) No. 8, Warrendal, Pennsylvania, USA, pp. 71–78.

Primary Examiner—Noah P. Kamen
Attorney, Agent, or Firm—Evenson, Wands, Edwards, Lenahan & McKeown

[57] ABSTRACT

A method for the controlled addition of an additive to the fuel supply of a vehicle internal combustion engine, in particular a diesel engine with an exhaust particulate filter, in which the addition is performed as a function of an increase in the fuel supply. While the vehicle is in motion with the engine running, the fuel level is measured at predetermined short time intervals and, having been averaged over a predetermined number of these time intervals, is fed to a measured-value storage device in which the previous average value is compared with the new average value. When a differential value is detected in the average value comparison which exceeds a predetermined tolerance level, an addition of additive proportional to the increase in the level is triggered. After each comparison, the previous average value is erased and replaced by the new average value.

3 Claims, 2 Drawing Sheets

METHOD FOR THE CONTROLLED ADDITION OF AN ADDITIVE TO THE FUEL SUPPLY OF A VEHICLE INTERNAL COMBUSTION ENGINE

BACKGROUND AND SUMMARY OF THE INVENTION

The present invention relates to a method for the controlled addition of an additive to the fuel supply of a vehicle internal combustion engine. Such an additive supply system is particularly useful, for example, with a diesel engine equipped with an exhaust particulate filter, which can be burned free more effectively by the addition of a fuel additive.

Additive metering of this kind is known from DEC-36 26 419, in which a check is made every time the vehicle remains stationary for a predetermined time period as to whether an increase in the fuel level occurs. If an increase is detected, it is treated as an indication of an addition of fuel, and consequently an addition of additive proportional to the increase in the fuel level is performed. In this method, the addition of additive can be carried out while the vehicle is stationary. However, since the interior noise level while the vehicle is stationary is usually extremely low in vehicles with a high level of finish, even with the engine running, the noise caused by addition of additive (the pump delivering the additive to the fuel) is often considered to be an unusual undesired noise. It is an important object of the present invention to provide an improvement particularly in this regard. It is a further object of the invention to eliminate or at least minimize measurement errors, which can occur due to a tilted position of the vehicle during refuelling if the level comparison measurements have not been taken exclusively in the same position of the vehicle.

This complex of problems is solved according to the invention, in which measured values for the fuel level, averaged continuously from individual measured values for a certain period of time, are in each case compared to one another successively. That is, the last average value is compared to the penultimate average value, while the vehicle is in motion, the driving condition being detected by a speed sensor (known per se). Any difference which exceeds a certain predetermined tolerance level in the course of this comparison is evaluated as a corresponding increase in the fuel volume, and thus causes an addition of additive proportional to the increase in the fuel supply, by means of a pump. It is not necessary for the vehicle to be stationary in this method. On the contrary, it would be possible to refuel the vehicle during driving, in which case the addition of additive would be carried out in the same manner.

In the method for the addition of additive according to the invention, because level measured values averaged over a plurality of time intervals are used for evaluation only during driving, metering can necessarily only occur during driving. This has the advantage that, due to the higher noise level in the interior of the vehicle in driving operation (compared to that when the vehicle is stationary), the noise emanating from the metering pump is either imperceptible to the driver, or is at least not perceived as an annoyance.

To ensure that the noise of the metering pump is not troublesome in the interior of the vehicle, its activation is also made dependent on the attainment of a predetermined driving speed.

Incorrect diagnoses due to measurements with at times differing tilted positions of the vehicle are largely eliminated by evaluating only measured values averaged over a plurality of time intervals.

The individual measurements carried out only while the vehicle is in motion can, for example, be performed at time intervals of 0.01 time units/sec. About 10,000 time intervals can be used for averaging in each case. The averaged values are compared for the purpose of detecting an increase in the fuel level, the comparison in each case being between the most recent value and the immediately preceding value. After the comparison, the immediately preceding value is overwritten by the last value, which is stored until it is overwritten by a new value. It is immaterial for this sequence whether the vehicle stops in the meantime or whether the engine is switched off or not. The most recent average value is retained in the measured value storage device until, after a comparison with a new value, it is overwritten, which takes places irrespective of the result of the comparison. The result of the comparison is the only deciding factor in determining whether or not metering is to take place.

In order to make metering independent of chance fluctuations of the indicated fuel level due to driving, which are impossible to eliminate with absolute certainty in unfavorable driving situations (even by averaging), a certain freely selectable measured value difference must be exceeded before metering is activated. This tolerance threshold can, for example, be determined experimentally and then set to the optimum.

Other objects, advantages and novel features of the present invention will become apparent from the following detailed description of the invention when considered in conjunction with the accompanying drawings.

DETAILED DESCRIPTION OF THE DRAWINGS

Figure 1:
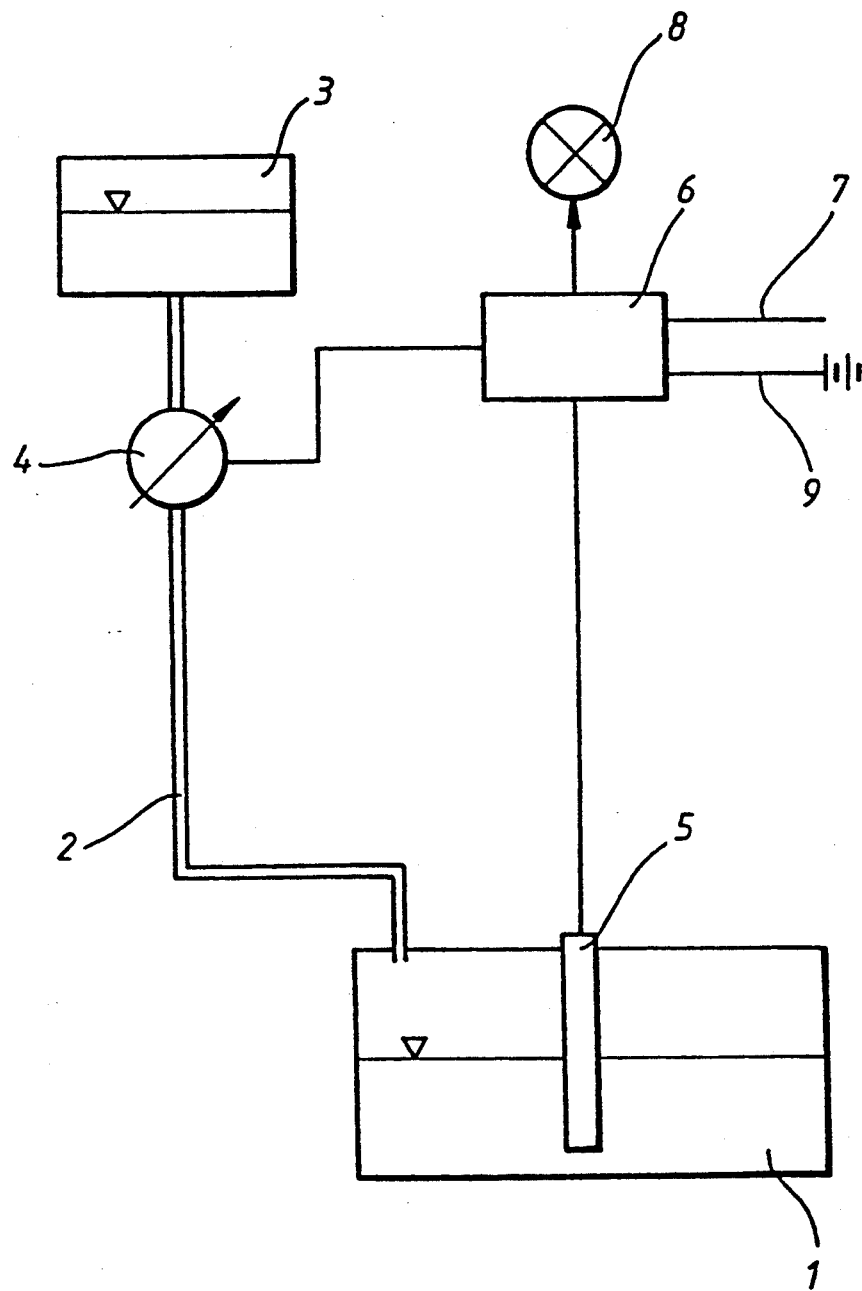
FIG. 1 is a schematic depiction of a metering system according to the invention.

Referring to FIG. 1, a fuel tank 1 is connected via a conduit 2 to an additional tank 3 containing an additive. The addition of additive to the fuel tank is effected via a metering pump 4. A tank sensor 5 provided in the tank 1 measures the fuel level and transmits the measured value to an electronic additive metering device 6, which controls the metering pump 4. The electronic additive metering device 6 evaluates the measured fuel level in accordance with the invention, for which purpose it is supplied with a signal 7 representing the speed of the vehicle. A fault indication signal device 8 connected to the electronic additive metering device 6 monitors its operation and emits a signal (for example a flashing light) in the event of a malfunction. The voltage supply to the electronic device 6 is provided via the supply conductor 9.

Figure 2:
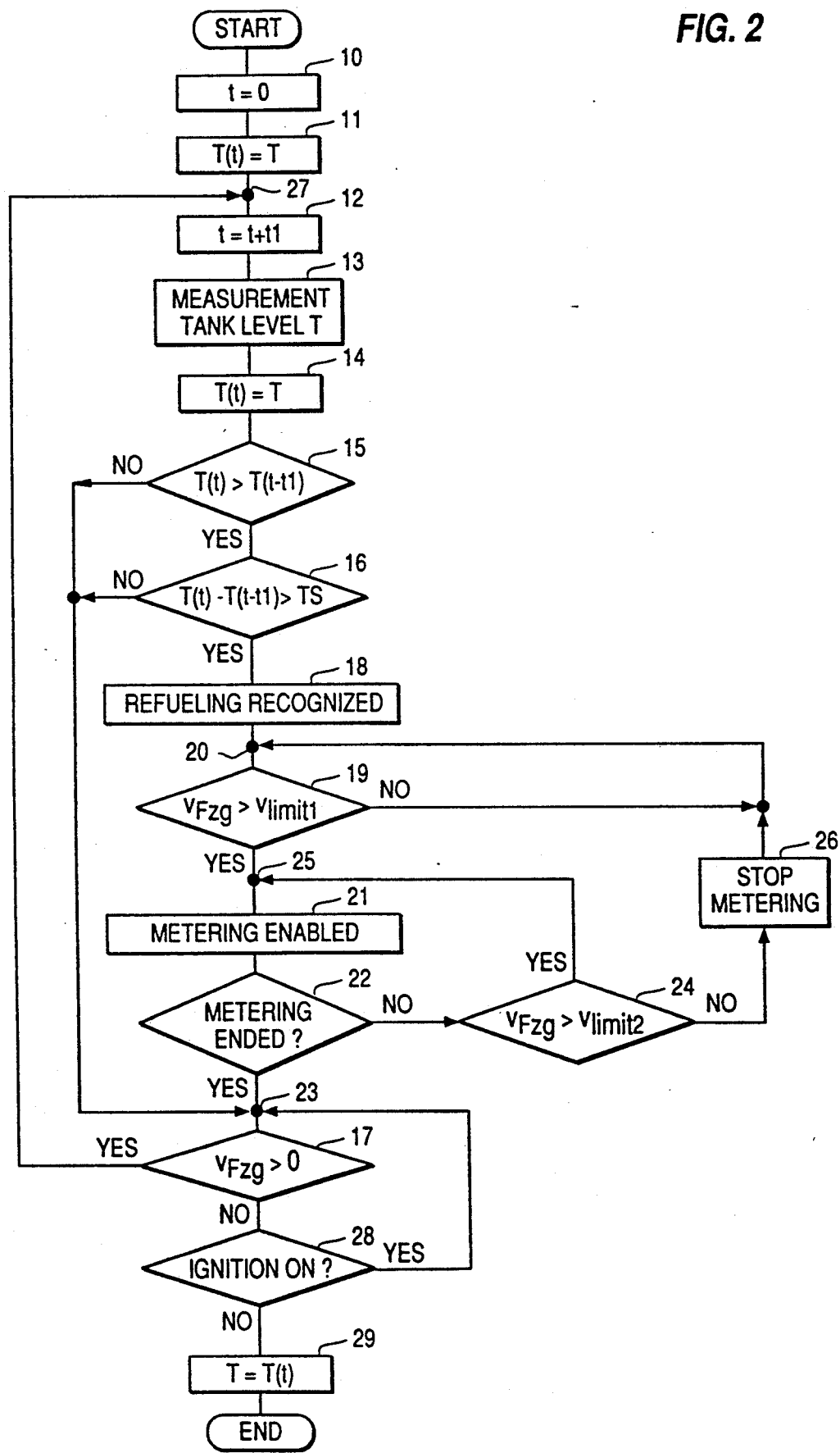
FIG. 2 shows the manner of operation of the system in FIG. 1 in the form of a flow diagram.

The manner of operation of the electronic additive metering device as shown in the flow diagram of FIG. 2, is as follows:

A timer is first of all reset in block 10 (t=0). In the following block 11, the tank level T which was stored the last time the internal combustion engine was switched off is assigned to the time t=0 as the current tank level T (t). After the expiry of a predetermined time interval $t_1$ (Block 12), the current tank level is measured again in input block 13 and, in accordance with block 14, the measured value is stored as the new current value T (t).

In the subsequent decision block 15, a check is made as to whether the current tank level T (t) is greater than the level T $(t-t_1)$ measured at time $t-t_1$; i.e., a check is made as to whether the tank level has increased between the two measurements.

If so, a check is made in the next decision block 16 as to whether this increase T (t)−T $(t_1)$ is greater than a predetermined threshold value $T_s$. If not, then (as in the case of the inquiry requiring the answer no in block 15) a jump to point 23 occurs, for a subsequent check in inquiry block 17 as to whether the engine is still in operation or has been switched off in the meantime.

If the predetermined threshold value $T_s$ is exceeded (block 16), then, in accordance with block 18, a refuelling operation is recognized.

In the subsequent decision block 19, the program inquires whether the current vehicle speed $v_{Fzg}$ is greater than a predetermined $v_{Limit1}$. If not, the program branches to point 20 for a renewed enquiry in block 19. Only when the current vehicle speed ($v_{Fzg}$) exceeds this limiting value $v_{Limit1}$ is the metering of the fuel additive enabled in the operation block 21.

While metering is in progress (block 22), the control program branches to the inquiry block 24, in which a check is made as to whether the instantaneous vehicle speed $v_{Fzg}$ is greater than a second limiting value vlimit2. If so, metering is continued by branching to point 25.

If not, then in block 26 metering is interrupted and the program jumps to point 20. Metering is enabled again when the inquiry in block 19 is answered in the affirmative.

Once metering has been completed (decision block 22), an inquiry is made in block 17 as to whether the vehicle is in motion. If so, the control program jumps to point 27 for renewed measurement of the tank level T in block 13 after expiry of a further time interval $t_1$ (block 12). If, however, the vehicle is stationary ($v_{Fzg}=0$), the program branches to inquiry block 28 and a check is made as to whether the ignition is switched on. If so, the control program jumps to point 23 again. If not (i.e., the engine has been switched off in the interim), then the current tank level is stored in block 29 and the process terminates. After the next starting of the engine, this stored value serves as the first current tank level at time t=0 (Block 11).

The two limiting values ($v_{Limit1}$ and $v_{Limit2}$ are for example 8 km/h. Smaller values and different limiting values for the speed are possible.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method for the controlled addition of an additive to the fuel supply of a vehicle internal combustion engine, in which the point in time and the quantity of the metered addition is dependent on an increase in the fuel supply level detected by a measuring device integrated into the vehicle, said method comprising the steps of:

measuring the fuel level at predetermined time intervals, while the vehicle is moving with the engine running;

averaging the results of such measurement over a predetermined number of said time intervals to determine a current average value;

supplying the current average value to a measured-value storage device;

comparing said current average value to a preceding average value;

when a differential value between said current average value and said preceding average value exceeds a predetermined tolerance level, triggering an addition of additive proportional to an increase in the level; and after each comparison, erasing said preceding average value and entering said current average value in place thereof.

2. Method according to claim 1, wherein an addition of additive can take place only above a predetermined driving speed.

3. Method according to claim 1, wherein said engine is a diesel engine which is equipped with an exhaust particulate filter.

* * * * *